United States Patent

Mitchell et al.

(10) Patent No.: US 10,042,421 B2
(45) Date of Patent: Aug. 7, 2018

(54) SYSTEM AND METHOD OF LATENCY-AWARE RENDERING OF A FOCAL AREA OF AN ANIMATION

(71) Applicant: DISNEY ENTERPRISES, INC., Burbank, CA (US)

(72) Inventors: Kenneth J. Mitchell, London (GB); Darren Cosker, Bath (GB); Nicholas T. Swafford, Bath (GB)

(73) Assignee: Disney Enterprises, Inc., Burbank, CA (US)

( * ) Notice: Subject to any disclaimer, the term of this patent is extended or adjusted under 35 U.S.C. 154(b) by 140 days.

(21) Appl. No.: 15/245,490

(22) Filed: Aug. 24, 2016

(65) Prior Publication Data

US 2018/0059780 A1 Mar. 1, 2018

(51) Int. Cl.
| | |
|---|---|
| G06F 3/01 | (2006.01) |
| G06T 13/20 | (2011.01) |
| G06T 15/20 | (2011.01) |
| G06T 3/40 | (2006.01) |
| A63F 13/52 | (2014.01) |
| A63F 13/21 | (2014.01) |

(52) U.S. Cl.
CPC .............. G06F 3/013 (2013.01); A63F 13/21 (2014.09); A63F 13/52 (2014.09); G06F 3/012 (2013.01); G06T 3/40 (2013.01); G06T 13/20 (2013.01); G06T 15/20 (2013.01); A63F 2300/8082 (2013.01)

(58) Field of Classification Search
CPC . G06F 3/013; G06T 3/40; G06T 13/20; G06T 1/205; A63F 13/21; A63F 13/52; A63F 2300/8082
See application file for complete search history.

(56) References Cited

U.S. PATENT DOCUMENTS

| | | | |
|---|---|---|---|
| 2006/0050383 A1 | 3/2006 | Takemoto | |
| 2010/0061553 A1 | 3/2010 | Chaum | |
| 2011/0091130 A1 | 4/2011 | Faubert | |
| 2012/0154277 A1* | 6/2012 | Bar-Zeev | G02B 27/017 345/158 |
| 2014/0176591 A1* | 6/2014 | Klein | G09G 3/003 345/589 |
| 2014/0184475 A1* | 7/2014 | Tantos | H03M 13/356 345/8 |
| 2016/0364881 A1 | 12/2016 | Mallinson | |
| 2017/0169602 A1* | 6/2017 | Blackmon | G06F 3/013 |
| 2017/0285735 A1* | 10/2017 | Young | G06F 3/013 |
| 2017/0372457 A1 | 12/2017 | Sylvan et al. | |

* cited by examiner

*Primary Examiner* — King Poon
*Assistant Examiner* — Vincent Peren
(74) *Attorney, Agent, or Firm* — Sheppard Mullin Richter & Hampton LLP

(57) ABSTRACT

Individual images for individual frames of an animation may be rendered to include individual focal areas. A focal area may include one or more of a foveal region corresponding to a gaze direction of a user, an area surrounding the foveal region, and/or other components. The foveal region may comprise a region along the user's line of sight that permits high visual acuity with respect to a periphery of the line of sight. A focal area within an image may be rendered based on parameter values of rendering parameters that are different from parameter values for an area outside the focal area.

18 Claims, 8 Drawing Sheets

SYSTEM AND METHOD OF LATENCY-AWARE RENDERING OF A FOCAL AREA OF AN ANIMATION

FIELD OF THE DISCLOSURE

This disclosure relates to a system and method of latency-aware rendering of a focal area of an animation.

BACKGROUND

When rendering digital images in animations, it is often assumed that the human visual system is perfect, despite limitations arising from a variety of different complexities and phenomena. That is, current methods of real-time rendering of a digital animation may operate on an assumption that a single rendered frame image will be fully visually appreciated at any single point in time. However, peripheral vision may be significantly worse than foveal vision in many ways, and these differences may not be explained solely by a loss of acuity. However, acuity sensitivity still forms a significant portion of peripheral detail loss and can be a phenomena to exploit.

One method of exploitation, termed "foveated rendering" or "foveated imaging," implements a high-resolution render of a particular region of individual frame images. A users gaze may be tracked so that the high-resolution render is positioned on the images to correspond with a user's foveal region. An area surrounding the high-resolution region is then rendered at relatively lower resolution. However, users may experience visual anomaly when prompted about the fact. Other techniques have implemented a foveated rendering method with spatial and temporal property variation. With such techniques, at a certain level-of-detail (LOD), users may experience the foveated renders to be of equal or higher quality than non-foveated counterparts.

With the increasing use of 4K-8K UHD displays and the push towards higher pixel densities for head-mounted displays, the industry is pressured to meet market demands for intensive real-time rendering.

SUMMARY

Latency in a system configured to achieve foveated image rendering may produce a "pop" effect caused by a high-resolution foveal region "catching up" to a user's actual gaze direction. Accordingly, one aspect of the disclosure relates to a system configured for latency-aware rendering of a focal area of an animation presented on a display. The focal area may comprise an area corresponding to a user's foveal region and an area surrounding the foveal region. The focal area may comprise an area that may be larger than the foveal region. For some estimated maximum saccadic speed, overall system latency, and/or other latency-attributing factors, the foveal region may be contained (at least in part) within the focal area. In this way the "pop" effect may be avoided at the expense of computational gain.

In some implementations, the system may include one or more physical processors configured by machine-readable instructions. Executing the machine-readable instructions may cause the one or more physical processors to facilitate latency-aware high resolution rendering of a focal area of an animation presented on a display. In some implementations, the animation may comprise views of a virtual space. The virtual space may include a video game taking place in the virtual space. The animation may include a sequence of frame. The frames of the animation may comprise images of the virtual space within a field of view of the virtual space. The machine-readable instructions may include one or more of a space component, a field-of-view component, a gaze component, a latency component, a focal area component, a render component, and/or other components.

The space component may be configured to obtain state information describing state of a virtual space. The state of the virtual space at an individual point in time may define one or more of one or more virtual objects within the virtual space, positions of the one or more virtual objects, and/or other information.

The field of view component may be configured to determine a field of view of the virtual space. The frames of the animation may comprise images of the virtual space within the field of view. By way of non-limiting example, a first frame may comprise an image of the virtual space within the field of view at a point in time that corresponds to the first frame.

The gaze component may be configured to determine a gaze direction of a user within the field of view. The user may be viewing the animation via a display. The gaze direction may define a line of sight of the user.

The latency component may be configured to obtain gaze adjustment latency. The gaze adjustment latency may quantify latency in one or more of determining changes in the gaze direction, making corresponding adjustments to a focal area within the field of view, and/or carrying out other operations.

The focal area component may be configured to determine a focal area within the field of view based on one or more of the gaze direction, the gaze adjustment latency, and/or other information. The focal area may include one or more of a foveal region corresponding to the gaze direction, an area surrounding the foveal region, and/or other components. The foveal region may comprise a region along the user's line of sight that permits high visual acuity with respect to a periphery of the line of sight.

The render component may be configured to render, from the state information, individual images for individual frames of the animation. Individual images may depict the virtual space within the field of view determined at individual points in time that correspond to individual frames. The focal area within the field of view may be rendered at a higher resolution than an area outside the focal area. By way of non-limiting example, the rendered images may include a first image for the first frame, and/or other images for other frames of the animation. The first image may depict the virtual space within the field of view at the point in time corresponding to the first frame.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
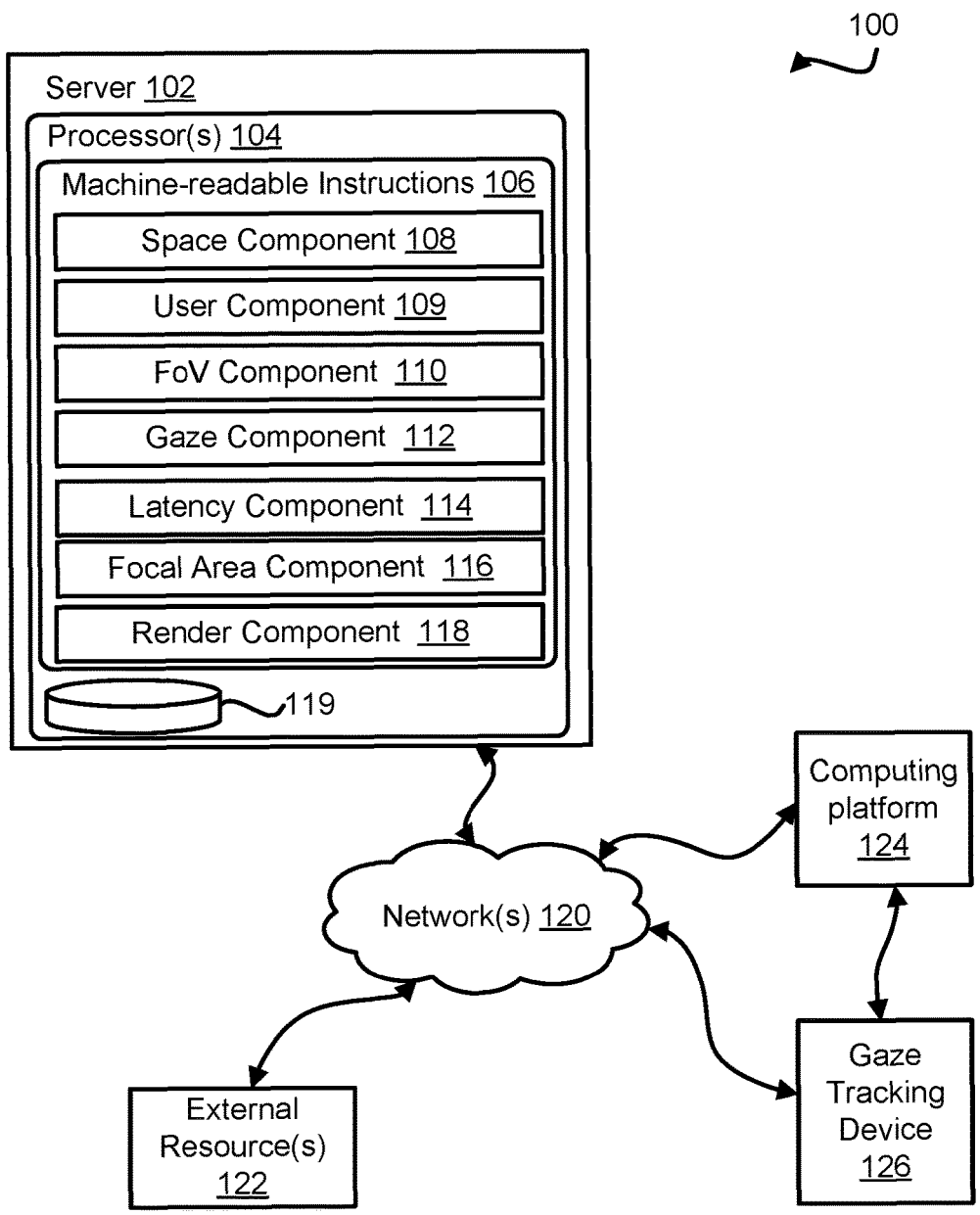
FIG. 1 illustrates a system configured for rendering a focal area of an animation presented on a display, in accordance with one or more implementations.

FIG. 1 illustrates a system 100 configured for rendering a focal area of an animation presented on a display, in accordance with one or more implementations. In conventional rendering, despite its significance, human visual perception is assumed to be perfect. That is, displayed frame images of an amination are continuously expected to be fully visually appreciated (e.g. with respect to resolution, color, and/or other visual attributes), regardless of even some of its most obvious flaws, for example loss of acuity outside the eye's foveal region.

One or more implementations of system 100 propose solutions on how to efficiently perform perceptually lossless rendering, wherein a focal area of individual frame image may be rendered at a relatively higher visual fidelity (e.g., with respect to one or more of resolution, color, luminance, and/or visual attributes) than areas outside the focal area. Areas outside the focal area may be indistinguishable from the high fidelity counterpart (e.g., the focal area). Thus there may be little or no perceived difference in quality, but performance may be greatly increased.

In some implementations, an animation may comprise views of a virtual space. The animation may include a sequence of frame. The frames of the animation may comprise images of the virtual space within a field of view of the virtual space. The virtual space may include a video game taking place in the virtual space. In some implementations, the virtual space may comprise an immersive virtual reality space. In some implementations, the field of view at individual points in time may be predetermined, determined based on gameplay within the virtual space, determined based on a position and/or orientation of a user, and/or determined in other ways.

In some implementations, system 100 may be configured for latency-aware rendering of a focal area of an animation presented on a display. In some implementations, a latency aware formulation may be implemented for calculating the focal area. A predetermined and/or recursively determined system latency may be compensated for to maintain a foveated illusion at the cost of computational gain. An exemplary formula for determining the focal area may take into account one or more of a user's position, a maximal eye saccadic speed value, display characteristics, system latency, and/or other factors to ensure that the users foveal region may be contained (at least in part) within the focal area.

In some implementations, system 100 may be configured for gaze-predictive rendering of a focal area of an animation presented on a display. For example, identification of relatively lower and/or higher visual fidelity regions (e.g., with respect to resolution, color, luminance, and/or other visual attributes) of frame images may be "trained" based on statistical targets of eye fixation that correspond to the users foveal region. Training data may be pre-computed on a database of previous eye tracked viewing sessions of a given animation, and applied in real-time. This precomputed gaze anticipation, or gaze-prediction, approach may facilitate scheduled render processing according to learned expected saccades and gaze directions. In anticipating gaze, this approach may identify focal areas within frame images ahead of image rendering, which may be valuable for latency critical rendering and display systems. In some implementations, view dependent material rendering with glossy or mirror effects may be preempted (to a degree) with this approach. Some indirect light bounce effects (global illumination, caustics, scattering, etc.) from scene materials may be pre-sampled according to predicted gaze direction. Live eye tracking and tracking of eye depth and light accommodation which also takes significant computation and may be difficult to sense with current high cost eye tracking hardware, may also be precomputed.

In some implementations, system 100 may be configured for bandwidth-sensitive rendering of a focal area of an animation presented on a display. Within such an implementation, the rendering of images may be optimized for bandwidth considerations through exploitation of one or more of foveal color, luminance perception, quality level parameter for post processing effects, texture sampling parameter for coarser looking textures, coarser physics accuracy, coarser global illumination features accuracy (shadow resolution, ambient occlusion resolution), geometry tessellation, and/or other aspects that may affect bandwidth.

The foveal region's color sensing receptor cones are densely packed versus the peripheral region. One or more implementations of system 100 propose reducing a color bit depth in areas outside a focal area. Rod density, which may not be sensitive to color, falls off away from the foveal region, therefore luminance bit depth may also be reduced outside the focal area. In some implementations, the manner in which bit depths may be reduced may follow a nonlinear function. By way of non-limiting example, in low-light conditions, luminance perception may be strongest at approximately 25 degrees angular deviation from the line-of-sight. Blue cones are sparse in the eye (2%) and absent from the fovea, but red and green in current human vision may be perceptually similar to blue (suggesting learned response later in the visual system). In general, levels of color distinction correspond directly to how much bandwidth may be minimally necessary. Further, variable temporal sensitivity across the retina may correspond to minimum necessary temporal bandwidth in perceptually lossless rendering.

The system 100 may include one or more of one or more computing platforms (e.g., computing platform 124 and/or one or more other computing platforms), one or more servers (e.g., server 102 and/or other servers), and/or other components. In some implementations, one or more computing platforms (e.g., computing platform 124) may be configured to communicate with one or more servers (e.g., server 102) according to a client/server architecture and/or other communication scheme. In some implementations, computing platform 124 may communicate with one or more other computing platforms according to a peer-to-peer architecture, via communications routed through one or more servers, and/or other communication scheme. The users may access system 100 and/or the virtual space via computing platforms associated with the users.

Individual computing platforms may include one or more of a cellular telephone, a smartphone, a head-up display, a virtual reality headset (e.g., a head-mounted display such as a FOVE head-mounted display), a laptop, a tablet computer, a desktop computer, a television set-top box, a client device, a smart TV, a gaming console, and/or other devices suitable for the intended purposes as described herein. Individual computing platforms may include a display configured to present the animation for viewing by a user, and/or other components. A display may comprise one or more of a display screen, a graphics processing unit, and/or other components. In some implementations, one or more computing platforms may operate together as part of an immersive virtual reality environment, such as a cave automatic virtual environment (CAVE).

In some implementations, a virtual reality headset may comprise one or more inertial measurement units, other sensors, and/or other components. The one or more inertial measurement units and/or other sensors may be configured to generate output signals conveying one or more of position, orientation, acceleration, and/or other information associated with the virtual reality headset. By way of non-limiting illustration, a virtual reality headset may comprise one or more of an OCULUS RIFT by OCULUS VR, a HOLOLENS by MICROSOFT, and/or other devices.

In some implementations, server 102 may include one or more physical processors 104 configured by machine-readable instructions 106, electronic storage 119, and/or other components. Executing the machine-readable instructions 106 may cause server 102 to facilitate rendering a focal area of an animation. The machine-readable instructions 106 may include one or more of a space component 108, a user component 109, a field of view component 110 (abbreviated "FoV Component 110" in FIG. 1), a gaze component 112, a latency component 114, a focal area component 116, a render component 118, and/or other components.

It is noted that in some implementations, one or more features and/or functions attributed to server 102 may be attributed to individual computing platforms. By way of non-limiting example, computing platform 124 may be configured to facilitate rendering a focal area of an animation using information stored by and/or local to computing platform 124 (e.g., a cartridge, a disk, a memory card/stick, USB memory stick, electronic storage, and/or other considerations) and/or other information. By way of non-limiting example, one or more processors of computing platform 124 (not shown in FIG. 1) may include machine-readable instructions that may comprise one or more of the same or similar components of machine-readable instructions 106 of server 102.

The space component 108 may be configured to implement one or more instances of a virtual space and/or video game taking place in the virtual space executed by machine-readable instructions 106. The space component 108 may be configured to determine views of the virtual space. The views of the virtual space may correspond to a field of view within the virtual space determined by the field of view component 110. The views may then be communicated (e.g., via streaming, via object/position data, and/or other information) from server 102 to computing platforms for presentation to users. In some implementations, the views presented to a user may be expressed as rendered frame images (see, e.g., render component 116).

The instance of the virtual space may comprise a simulated space that is accessible by users via computing platforms that present the views of the virtual space (e.g., present the rendered images). The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by machine-readable instructions 106 may be synchronous, asynchronous, and/or semi-synchronous.

In some implementations, views of the virtual space may be determined based on state information and/or other information. The state information may describe state of the virtual space. The state of the virtual space at an individual point in time may define one or more of one or more virtual objects (e.g., player characters, non-player characters, topographical elements of an environment of the virtual space, and/or other virtual objects) within the virtual space, their positions, and/or other information. In some implementations, the state of the virtual space may correspond to a state of a game taking place in the virtual space. By way of non-limiting example, a view determined and/or presented to a given user may correspond to a game entity being controlled by the given user. The state information may further correspond to one or more of a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The above description of the manner in which views of the virtual space are determined by space component 108 is not intended to be limiting. The space component 108 may be configured to express the virtual space in a more limited, or richer, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space component 108, users may control game entities, objects, simulated physical phenomena (e.g., wind, rain, earthquakes, and/or other phenomena), and/or other elements within the virtual space to interact with the virtual space and/or each other. One or more user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual items and/or currency that the user can use (e.g., by manipulation of a game entity or other user controlled element, and/or other items) within the virtual space.

User participation in the virtual space may include controlling one or more of the available user controlled elements in the virtual space. Control may be exercised through control inputs and/or commands input by the users through individual computing platforms. The users may interact with each other through communications exchanged within the virtual space. Such communications may include one or more of textual chat, instant messages, private messages, voice communications, and/or other communications. Communications may be received and entered by the users via their respective computing platforms. Communications may be routed to and/or from the appropriate users through server 102.

User participation in the virtual space may include controlling one or more game entities in the virtual space. A game entity may refer to a virtual object (or group of objects) present in the virtual space that represents an individual user. A game entity may be a virtual character (e.g., an avatar) and/or other virtual object. A group of game entities may include a group of virtual characters, virtual objects, and/or other groups.

Virtual objects may include virtual items and/or good. Virtual items and/or goods may include one or more of a virtual weapon, a tool, a food, a currency, a reward, a bonus, health, a potion, an enhancement, a mount, a power-up, a speed-up, clothing, a vehicle, an anatomical feature of a game entity, a troop or troop type, a pet, a virtual resource, and/or other virtual items and/or goods.

In some implementations, an instance of the virtual space may be persistent. That is, the virtual space may continue on whether or not individual players are currently logged in and/or participating in the virtual space. A user that logs out of the virtual space and then logs back in some time later may find the virtual space has been changed through the interactions of other players with the virtual space during the time the player was logged out. These changes may include changes to the simulated physical space, changes in the user's inventory, changes in other user's inventories, changes experienced by non-player characters, changes to the virtual items available for use in the virtual space, and/or other changes.

The user component 109 may be configured to access and/or manage one or more user profiles, user information, and/or user accounts associated with the users. The one or more user profiles and/or user information may include information stored locally by a given computing platform, by server 102, one or more other computing platforms, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual (or real) currency account information (e.g., related to currency held in credit for a user), control input information (e.g., a history of control inputs provided by the user), virtual inventory information (e.g., virtual inventories associated with the users that include one or more virtual items available for the users in the virtual space), relationship information (e.g., information related to relationships between users in the virtual space), virtual space usage information (e.g., a log-in history indicating the frequency and/or amount of times the user logs-in to the user accounts), interaction history among users in the virtual space, information stated by users, browsing history of users, a computing platform identification associated with a user, a phone number associated with a user, predictive gaze direction information (described in more detail herein), and/or other information related to users.

The field of view component 110 may be configured to determine a field of view of the virtual space. The field of view determined by field of view component 110 may dictate the views of the virtual space determined and presented by the space component 108. By way of non-limiting example, a frame of the animation may comprise an image of the virtual space within the field of view at a point in time that corresponds to the frame.

In some implementations, the field of view may be predetermined for one or more points in time that correspond to one or more frames of the animation. By way of non-limiting illustration, gameplay within the virtual space may guide the player along a predetermined path within the virtual space such that the field of view of the virtual space may be predetermined for one or more points in time during gameplay. In some implementations, the field of view may be predetermined for one or more points in time that correspond to a non-interactive in-game cutscene (e.g., also referred to as an in-game cinematic and/or in-game movie).

In some implementations, the field of view may be determined based on control inputs and/or commands input by a user through a computing platform. The control inputs and/or commands may dictate control of a game entity associated with the user within the virtual space. The game entity may be positioned at a location in the virtual space. The field of view may correspond to one or more of the location in the virtual space (e.g., the location from which the view is taken, the location the view depicts, and/or other locations), a point of view from the perspective of the game entity (e.g., a first person perspective and/or a third person perspective), and/or other information.

In some implementations, the field of view may be determined based on sensor output generated by one or more sensors of a computing platform. By way of non-limiting example, a computing platform may comprise a virtual reality headset and/or other computing platform. An inertial measurement unit and/or other sensors generating sensor output conveying one or more of position, orientation, acceleration, and/or other information associated with a virtual reality headset may dictate the field of view in the virtual space. For example, the virtual space may comprise an immersive virtual reality space. The virtual reality headset may be worn on the user's face and/or head. The user may turn their head (e.g., look around) to change the field of view of the virtual space from which views of the virtual space that are determined and presented to them via a display screen of the headset.

The gaze component 112 may be configured to determine a gaze direction of a user within the field of view, and/or other gaze information. The gaze direction may define one or more of a line of sight of the user, and/or other information. The gaze direction may be expressed as a vector in a three-dimensional coordinate system, and/or expressed in other ways.

The line-of-sight may comprise a virtual line connecting the fovea of the users eye with a fixation point. The gaze direction and/or line-of-sight may further correspond to a foveal region. The foveal region may comprise a region along the user's line of sight that permits high visual acuity with respect to a periphery of the line of sight (e.g., peripheral vision). The foveal region projected onto a plane (e.g., on a display screen the user is watching) may be determined based one or more of a distance of the fixation point from the users eye, an angle subtended by the fovea, and/or other information.

In some implementations, the gaze direction may be determined by one or more gaze tracking devices (such as gaze tracking device 126). Gaze tracking device 126 may comprise a device configured to determine and/or track eye movement, and/or determine gaze in other ways. The gaze tracking device 126 may comprise one or more of a camera, a processing unit, and/or other components. The camera may be configured to capture video of one or both eyes and/or record their movement as the user looks at some kind of stimulus (e.g., a display screen). By way of non-limiting example, tracking may be accomplished by identifying a center of the pupil(s) and infrared/near-infrared non-collimated light to create corneal reflections (CR). A vector between the pupil center and the corneal reflections may be determined to compute a fixation point on surface and/or the gaze direction. A calibration procedure of the individual user may be performed.

Figure 9:
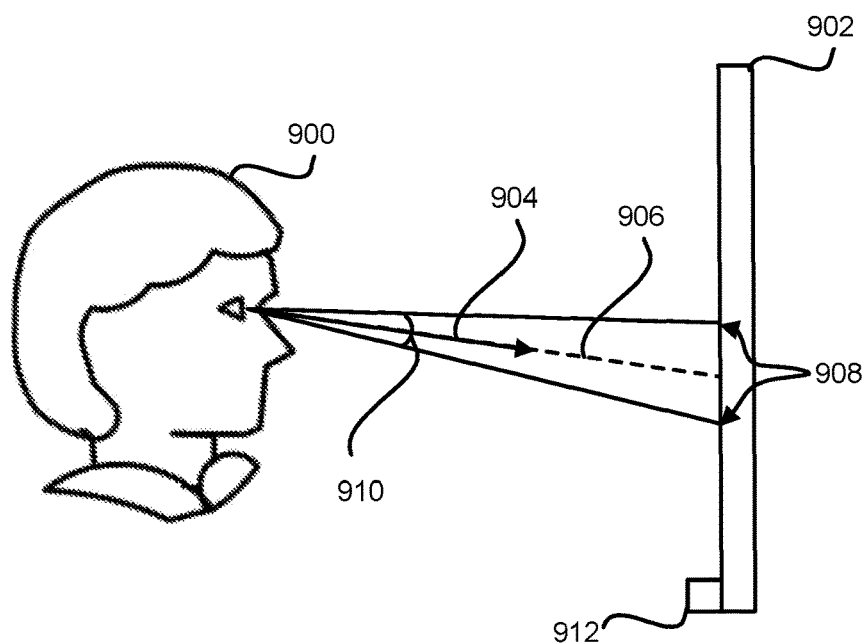
FIG. 9 shows an exemplary graphic of a user viewing a display of a computing platform.

By way of non-limiting example, FIG. 9 shows an exemplary graphic of a user 900 viewing a display 902 of a computing platform (not shown in FIG. 9). The graphic illustrates a user's gaze direction 904, the user's line-of-sight 906 (which projects to a fixation point on the display 902), and a foveal region 908 projected on the display 902 (noting that that the graphic may not be to scale). The gaze direction 904 and/or line-of-sight 906 may be determined by a gaze tracking device 912 (e.g., the same or similar gaze tracking device 126 of FIG. 1) positioned at or near the display 902 of the computing platform. The gaze direction 904 may be expressed as a vector positioned in three-dimensional space using the gaze tracking device 912 (or other point in space) as an origin of a three-dimensional coordinate system. The foveal region 908 may be determined based on one or more of the gaze direction 904, the users distance from the display 902, an angle 910 subtended by the fovea of the user's eye (or eyes), and/or other information. By way of non-limiting example, conventional geometric relationships between sides and angles of a triangle may be employed to determine the length (e.g., diameter) of the projected foveal region 908.

Returning to FIG. 1, the gaze component 112 may be configured to predict a gaze direction of individual users. In some implementations, the prediction may be based on a machine learning approach and/or other technique for predicting gaze direction. For example, through machine learning, the gaze component 112 may be configured to identify statistical targets of eye fixation (e.g., fixation points and/or fixation regions), and determine from the targets a predicted gaze direction that corresponds to the user's foveal region. The machine learning approach may be trained based on a database of previous eye tracked viewing sessions of one or more animations.

In some implementations, statistical targets of eye fixation may be determined from previous eye tracked viewing sessions by one or more users. In some implementations, the statistical targets may be an average of targets of eye fixation determined from previous eye tracked viewing sessions by multiple users. In some implementations, the statistical targets may be an average determined from eye tracked viewing sessions by individual users. By way of non-limiting example, the statistical targets may be specific to individual users and applied for gaze prediction purposes specifically for the individual users when the individual users are viewing the animation.

In some implementations, statistical targets of eye fixation may be stored as predictive gaze direction information within a user account stored by user component 109. The predictive gaze direction information of an individual user account may comprise statistical targets of eye fixation that are specific to an individual user of the user account. In some implementations, predictive gaze direction information within a user account stored by user component 109 may comprise statistical targets that are averaged from pervious eye tracked viewing session of multiple users.

In some implementations, a prediction of gaze direction may be based on one or more virtual objects within a field of view of the virtual space. By way of non-limiting example, one or more virtual objects within a field of view may draw the users' attention relatively more than other virtual objects within the field of view. Such virtual objects may become a target of eye fixation for predicting the user's gaze direction. An individual virtual object may be predicted as a target of eye fixation based on one or more of movement of the individual virtual object, a position of the individual virtual object, a role assigned to the individual virtual object, and/or other factors. In some implementations, targets of eye fixation may be based on predicted high level semantic distractions, e.g. recognizing a face may leads to lower cognition of surrounding features in a field of view.

By way of non-limiting example, movement of a virtual object within a field of view of the virtual space may draw the user's attention to the virtual object and become a target of eye fixation. For example, a user may be drawn to a particular virtual object if it is moving within a field of view of the virtual space. In some implementations, a user may be drawn to a particular virtual object if it is moving within a field of view of the virtual space relatively faster than other virtual objects that may be present within the field of view. The positions of the virtual object at individual points in time within the field of view during movement may be predicted as targeted points (or regions) of eye fixation. Individual points (or regions) may facilitate determining a predicted gaze direction. For example, based on one or more of the user's distance from a display screen, an angle subtended by the fovea, and/or other factors, the gaze direction may be predicted (e.g., calculated). The gaze direction may be calculated such that the projection of the user's foveal region on the display screen corresponding to the predicted gaze direction may include at least some of the individual targeted points (or regions).

By way of non-limiting example, position of a virtual object within a field of view of the virtual space may draw the user's attention to the virtual object and become a target of eye fixation. For example, a user may be drawn to a virtual object that may be positioned at a relatively central part (or other part) of a display screen relative to other virtual objects that may be positioned towards a peripheral edge of the display screen. The position of the virtual object may be predicted as a targeted point (or region) of eye fixation. The point (or region) may facilitate determining a predicted gaze direction. For example, based on one or more of the user's distance from a display screen, an angle subtended by the fovea, and/or other factors, the gaze direction may be predicted such that the projection of the user's foveal region on the display screen includes at least some of the targeted point (or region).

By way of non-limiting example, individual roles assigned to individual virtual objects within a field of view of the virtual space may dictate where the user's attention may be drawn to. As a result, individual virtual object having a given role may become targets of eye fixation. Individual roles of individual virtual object may comprise one or more of a player character (e.g., a game entity associated with a user and controlled by the user), a teammate, a main or central character, a minor character, a protagonist, an antagonist, an anti-hero, an enemy, a combatant, a speaker, a listener, and/or other roles. It is noted that the above listing of roles assigned to virtual objects is provided for illustrative purposes only and is not to be considered limiting. For example, in some implementations, roles assigned to virtual object may be considered in other ways.

By way of non-limiting example, a position of a first virtual object assigned a first role may become a target of eye fixation based on the first virtual object being assigned the first role. By way of non-limiting illustration, a virtual object that is a player character within a field of view of a virtual space (e.g., via a third person perspective) may not be a target of eye fixation since the user may instead by focused on what happening around the player character. The user may be drawn instead to a virtual object that is a game enemy that may be approaching the player character. The positions of the approaching game enemy may become targeted points (or regions) of eye fixation.

By way of non-limiting illustration, a virtual object that may be assigned a speaker role (e.g., entity that may be performing a dialog) may become a target of eye fixation. A virtual object that may be assigned a listener role (e.g., entity that may be listening to another entity) may not be target of eye fixation.

By way of non-limiting illustration, a virtual object that may be assigned a main character role may become a target of eye fixation. A virtual object that may be assigned a combatant role that may move toward the main character virtual object may become a subsequent target of eye fixation.

The above descriptions of how statistical target training, movement of virtual objects, positions of virtual objects, and/or roles assigned to virtual objects may be used to predict gaze direction are provided for illustrative purposes only and is not to be considered limiting. For example, one or more other implementations of system 100 may employ other techniques for predicting gaze direction.

The latency component 114 may be configured to obtain gaze adjustment latency. The gaze adjustment latency may quantify latency in one or more of determining changes in the gaze direction, making corresponding adjustments to a focal area within a field of view of the virtual space, and/or other operations carried out by system 100. In some implementations, latency in system 100 may be attributed to one or more components included in system 100. By way of non-limiting example, latency in system 100 may be attributed to latency in gaze tracking device 126 in determining and/or tracking eye movement in order to determine a user's gaze direction. However it is noted that latency may be attributed to other factors. For example, latency in system 100 may be attribute to the speed at which information may be communicated through network 120, and/or other factors.

The gaze adjustment latency may be expressed through units of time. By way of non-limiting example, a gaze adjustment latency may be expressed as a numerical value in units of milliseconds, and/or units of time.

In some implementations, the gaze adjustment latency may be a predetermined value. For example, the gaze adjustment latency may be pre-set to a value that corresponds to latency attributed to gaze tracking device 126 and/or other components of system 100.

In some implementations, the gaze adjustment latency may be determined recursively. In some implementations, determining the gaze adjustment latency recursively may comprise determining a gaze adjustment latency after individual renders of individual images of individual frames of the animation (see, e.g., render component 116). Thus, gaze adjustment latency may be determined in an on-going basis during successive renders of frame images.

By way of non-limiting example, subsequent to rendering a first frame, and at a point in time corresponding to a second frame that occurs temporally after the first frame, latency component 114 may be configured to determine a gaze adjustment latency that quantifies latency in one or more of determining a change in gaze direction of the user between the first frame and an immediate prior frame, making corresponding adjustments to a focal area within a field of view (e.g., that was adjusted based on changes in gaze direction of the user between the first frame and the immediate prior frame), and/or other latency-attributed factors. Further, subsequent to rendering the second frame, and at a point in time corresponding to a third frame that occurs temporally after the second frame, latency component 114 may be configured to determine a gaze adjustment latency that quantifies latency in one or more of determining a change in gaze direction of the user between the first frame and second frame, making corresponding adjustments to the focal area within a field of view (e.g., that was adjusted based on changes in gaze direction of the user between the first frame and the second frame), and/or other latency-attributed factors.

The focal area component 116 may be configured to determine a focal area within a field of view of the virtual space. The focal area may be determined based on one or more of a gaze direction, a gaze adjustment latency, and/or other information. The focal area within the field of view may comprise one or more of a foveal region corresponding to the gaze direction, an area surrounding the foveal region, and/or other components. The focal area may comprise an area that may be larger than a true (e.g., tracked, calculated, and/or predicted) foveal region. As such, the focal area may be determined to account for system latency such that the foveal region in the field of view may be contained (at least in part) within the focal area.

In some implementations, a focal area may be determined based on other information associated with a user's gaze. By way of non-limiting illustration, a focal area may be determined based on one or more of a focus accommodation (e.g., vergence movements), saccadic movements, smooth pursuit movements, vestibulo-occular movements, and/or other information. Focus accommodation may be used to determine a focal area to be in areas of a focal depth and/or focal volume. In some implementations, a latency between vergence target intention and physical action may be exploited. Saccadic movements may incur a delay from target intention to physically catching up, which may afford a predictable adjustment time. Smooth pursuit movements may incur an initial saccade, then follow a target. In this case it may be predictable that a target remains constant in appearance and may exploit reprojection rendering effectively (reducing work for newly computed frames by re-projected prior frames). Vestibulo-occular movements may be inclusive of head stability tracking. Prediction of these movements may be incorporated into the reduction of necessary rendering computation.

In some implementations, determining the focal area may comprise determining one or more of a size of the focal area, a position of a center point of the focal area, and/or other information. In some implementations, the size may be a function of one or more of the gaze adjustment latency, a users' maximum saccadic speed, the user's distance from a display, an angle subtended by the fovea of the user's eye, a pixel density of the display, and/or other information.

In some implementations, the focal area may comprise a circular, or substantially circular area. In some implementation, a diameter of the focal area may be determined by the following equation:

$$F_\phi = 2\rho_{pixel} d_u \tan(L_{tot} S_{max} + \frac{\alpha}{2}) + 2b_w + c,$$

where $F_\phi$ is the diameter of the focal area, $L_{tot}$ is the gaze adjustment latency (e.g., in milliseconds), $S_{max}$ is the user's maximum saccadic speed in radians per millisecond, $d_u$ is the user's distance from the display, $\alpha$ is the angled subtended by the fovea (e.g., approximately 5 degrees, and/or other angle), $b_w$ is the width of the blending boarder between a peripheral edge of the focal area and an area outside the focal area, $\rho_{pixel}$ is the pixel density of the display in pixels per millimeter (or other units of density), and c is an error constant. A blending boarder may provide a region that smoothly blends a boarder of a focal area from "sharp focus" inside the focal area to "blurred undetailed" in the region outside the focal area.

It is noted that the above equation for determining a diameter of a focal area is provided for illustrative purposes only and is not to be considered limiting. For example, in some implementations, focal area may be determined in other ways.

Figure 2:
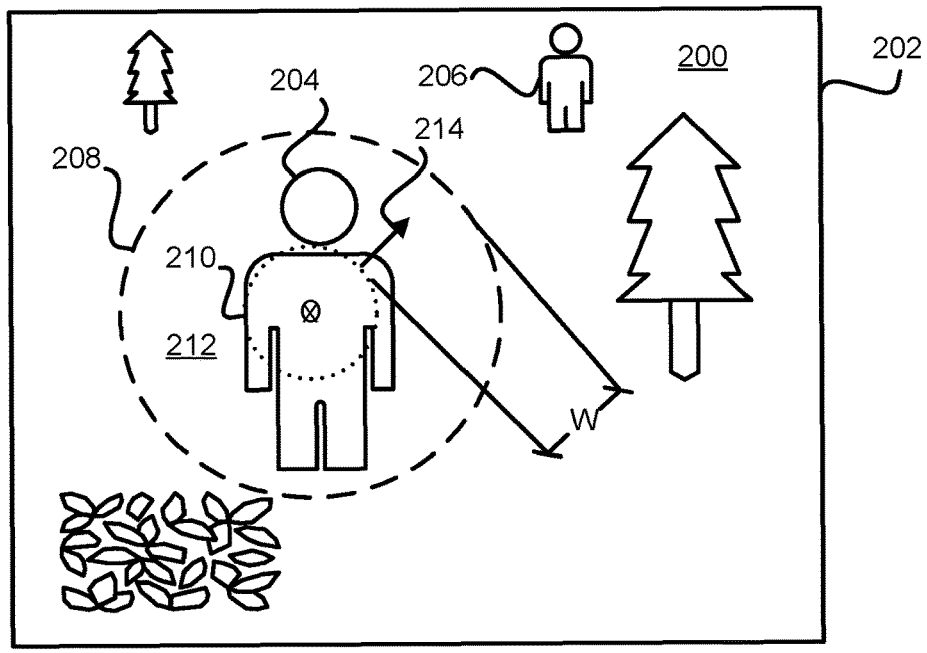
FIG. 2 illustrates an exemplary graphic of a rendering of a focal area in an image of a frame corresponding to a first point in time, in accordance with one or more implementations.
Figure 3:
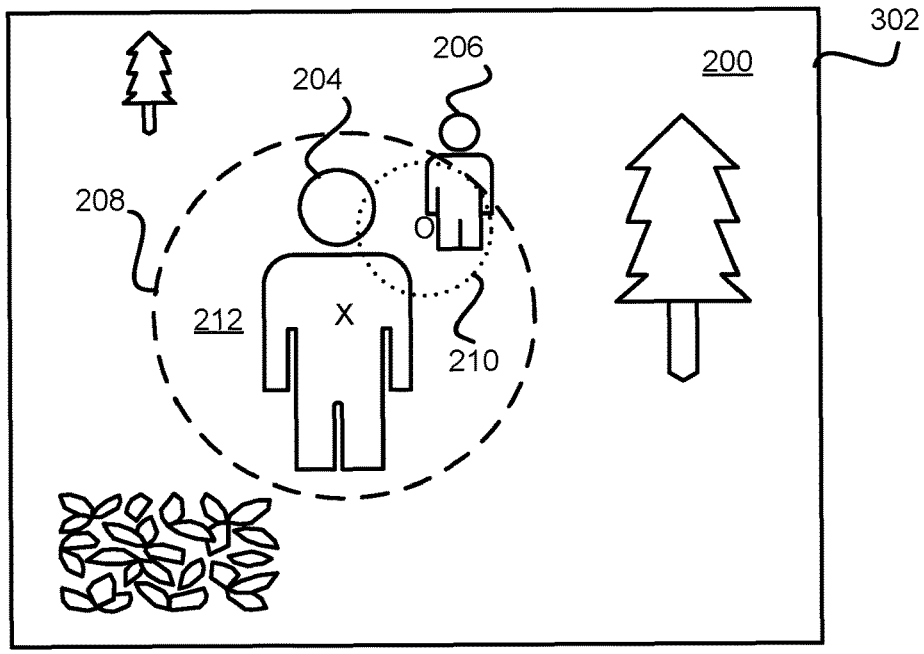
FIG. 3 illustrates an exemplary graphic of a rendering of the focal area in an image, in accordance with one or more implementations.

By way of non-limiting illustration, a focal area may be determined such that a distance between a peripheral edge of the foveal region and a peripheral edge of the focal area may comprise a distance wherein for a given saccadic speed of a user's eye movement and gaze adjustment latency, the peripheral edge of the foveal region may not surpass the peripheral edge of the focal area (see, e.g., FIG. 2 and FIG. 3, described in more detail herein). Thus, the foveal region may be contained (at least in part) within the focal area.

In some implementations, the position of the focal area within the field of view may be determined based on the user's gaze direction, and/or other information. For example, the line of sight defined by the gaze direction may project to a fixation point on a display screen. The fixation point may comprise a center point of the user's true (e.g., tracked, calculated, and/or predicted) foveal region. The center point of the foveal region may be used to determine a center point of the focal area. By way of non-limiting example, the focal area may be positioned such that an imaginary center point of the focal area may be aligned with an imaginary center point of the users foveal region (e.g., the fixation point of the line of sight).

As noted herein, latency may exist in system 100 such that the determined position of the focal area (e.g., via a determined center point of the focal area) may lag in being aligned with a true (e.g., tracked, calculated, and/or predicted) center of the users foveal region that projects to the display (e.g., a fixation point). In some implementations, the manner in which in the size of the focal area may be calculated may ensure that, while accounting for latency in the system, the true (e.g., tracked, calculated, and/or predicted) foveal region in the field of view may be contained (at least in part) within the focal area while adjustments to the focal area are being made to "catch up" with the) foveal region. An illustrative example of this is presented in more detail herein with reference to FIGS. 2-4.

Returning to FIG. 1, the render component 118 may be configured to render images for frames. By way of non-limiting example, the render component 118 may be configured to render, from the state information, individual images for individual frames of the animation. Individual images may depict the virtual space within a field of view determined at individual points in time that corresponds to individual frames. The rendering component 118 may provide the rendered image to the space component 110 for presentation to users via computing platforms.

In some implementations, render component 118 may be configured to render individual images based on parameter values of one or more rendering parameters of the individual frames. Rendering parameters may comprise one or more of a resolution parameter, a color bit depth parameter, a luminance bit depth parameter, and/or other parameters.

A parameter value of a resolution parameter of an individual frame may specify one or more of a region within the field of view associated with the individual frame, a resolution at which a specified region may be rendered, and/or other information. By way of non-limiting example, a first value of a resolution parameter for a frame image may specify a focal area within a field of view corresponding to a point in time for the frame, a first resolution at which the focal area may be rendered, and/or other information. By way of non-limiting example, a second value of a resolution parameter for the frame image may specify an area outside of the focal area, a second resolution at which the specified area outside of the focal area may be rendered, and/or other information. In some implementations, the first resolution may be relatively higher than the second resolution.

In some implementations, the first resolution may be relatively higher insofar that the first resolution comprises a "standard" resolution value while the second resolution comprises a resolution value that may be a diminished (e.g., reduced) with respect to the standard resolution value. In some implementations, the first resolution may be relatively higher insofar that the second resolution comprises a "standard" resolution value while the first resolution comprises a resolution value that may be greater than the standard resolution value. In some implementations, the term "standard resolution" may refer to one or more of a resolution that may be intended by a provider of the virtual space, a resolution which a computing platform may be capable of presenting, and/or other information.

A parameter value of a color bit depth parameter of an individual frame may specify one or more of a region within the field of view associated with the individual frame, a color bit depth at which color in the specified region may be rendered, and/or other information. By way of non-limiting example, a first value of a color bit depth parameter for a frame image may specify a focal area within a field of view corresponding to a point in time for the frame, a first bit depth at which color for the focal area may be rendered, and/or other information. By way of non-limiting example, a second value of a color bit depth parameter for the frame image may specify an area outside of the focal area, a second bit depth at which color for the specified area outside of the focal area may be rendered, and/or other information. In some implementations, the first bit depth may be relatively higher than the second bit depth.

In some implementations, the first bit depth may be relatively higher insofar that the first bit depth comprises a "standard" bit depth while the second bit depth may comprise a bit depth that may be a diminished (e.g., reduced) bit depth with respect to the standard bit depth. In some implementations, the first bit depth may be relatively higher insofar that the second bit depth comprises a "standard" bit depth while the first bit depth comprises a bit depth that may be greater than the standard bit depth. In some implementations, the term "standard bit depth" may refer to one or more of a color bit depth that may be intended by a provider of the virtual space, a color bit depth which a computing platform may be capable of presenting, and/or other information.

A parameter value of a luminance bit depth parameter of an individual frame may specify one or more of a region within the field of view associated with the individual frame, a luminous bit depth at which luminous intensity of the specified region may be rendered, and/or other information. By way of non-limiting example, a first value of a luminance bit depth parameter for a frame image may specify a focal area within a field of view corresponding to a point in time for the frame, a first bit depth at which a luminous intensity for the focal area may be rendered, and/or other information. By way of non-limiting example, a second value of a luminance bit depth parameter for the frame image may specify an area outside of the determined focal area, a second bit depth at which the luminous intensity of the specified area outside of the focal area may be rendered, and/or other information. In some implementations, the first bit depth may be relatively higher than the second bit depth.

In some implementations, the first bit depth may be relatively higher insofar that the first bit depth comprises a "standard" bit depth while the second bit depth comprises a bit depth that may be a diminished (e.g., reduced) bit depth with respect to the standard bit depth. In some implementations, the first bit depth may be relatively higher insofar that the second bit depth comprises a "standard" bit depth while the first bit depth comprises a bit depth that may be greater than the standard bit depth. In some implementations, the term "standard bit depth" may refer to one or more of a bit depth for luminous intensity that may be intended by a provider of the virtual space, a bit depth for luminous intensity which a computing platform may be capable of presenting, and/or other information.

By way of non-limiting illustration, images rendered by rendering component 118 may include one or more of a first image for a first frame corresponding to a first point in time, a second image for a second frame corresponding to a second point in time, and/or other images for other frames corresponding to other points in time. The first image may depict the virtual space within a field of view at a point in time corresponding to the first frame. A focal area within the field of view may be rendered according to one or more parameter values of one or more rendering parameters that may be different from parameter values for an area outside the focal area.

It is noted that one or more features and/or functions of system 100 presented herein may be carried for other multimedia types. For example, one or more features and/or functions presented herein may be applied in the framework of generating and/or rendering deep media video formats (e.g., 360 VR with parallax ability to move through a video space). In this case, the process of rendering and encoding the VR video format may be accelerated and made more efficient through machine learning prediction of a perceptual focal depth in the context of the offline processed video content. Then, during playback, the VR video decoding and display may be accelerated and made more efficient through machine learning as above but dynamically in real-time VR display.

Reference is now made to FIGS. 2-8 which illustrate exemplary graphics of focal areas in frame images of an animation, in accordance with one or more implementations presented herein.

FIGS. 2-5 illustrate various frame images having focal areas rendered in accordance with a latency-aware implementation of system 100, and/or other implementations. For illustrative purposes, the frame images shown in the figures will be considered as sequentially rendered and presented frame images of an animation. For example, FIG. 2 illustrates a first image 202 of a first frame that corresponds to a first point in time. The first image 202 may include a view of a virtual space 200 corresponding a field of view of the virtual space determined for the first point in time. The view of the virtual space may include one or more virtual objects and their position determined from state information at the first point in time. The one or more virtual object may include a first virtual object 204, a second virtual object 206, and/or other virtual objects. The first virtual object 204 may be assigned a first role. The first role may comprise main character role and/or other role. The second virtual object 206 may be assigned a second role. The second role may comprise a combatant role, and/or other role.

The first image 202 may include a focal area 208 (having a peripheral edge shown by the dashed line and an imaginary center point shown by the "X"). The focal area 208 may comprise one or more of a foveal region 210 (having a peripheral edge shown by the dotted line and an imaginary center point shown by the "O"), an area 212 outside the foveal region 210, and/or other components. The center point "O" of the foveal region 210 may be a point of eye fixation. For illustrative purposes, the first image 202 may be associated with a point in time where the users has maintained a focus on the first virtual object 204 such that latency may have not yet come into effect. As such, the focal area 208 may be aligned with the users foveal region 210 (shown by the "X" overlaid on the "O"). However, as will be described in more detail below, the effect of latency may cause the focal area 208 to lag in maintaining an alignment with the foveal region 210.

It is noted that the depictions of the dashed line, dotted line, center point "X," and center point "O" are provided for illustrative purposes only. In practice, the boundary between the focal area 608 and area outside the focal area 608 may indeed be indistinguishable.

FIG. 3 illustrates a second image 302 of a second frame that corresponds to a second point in time. The second point in time may occur temporally after the first point in time. The second image 302 may include a view of the virtual space 200 corresponding a field of view of the virtual space determined for the second point in time. The second image 302 may include the focal area 208 comprising one or more of the foveal region 210, the area 212 outside the foveal region 210, and/or other components. The second image 302 depicts movement of the second virtual object 206 toward the first virtual object 204, for example, in accordance with one or more of a combat scenario, dialog, and/or other interaction.

Figure 4:
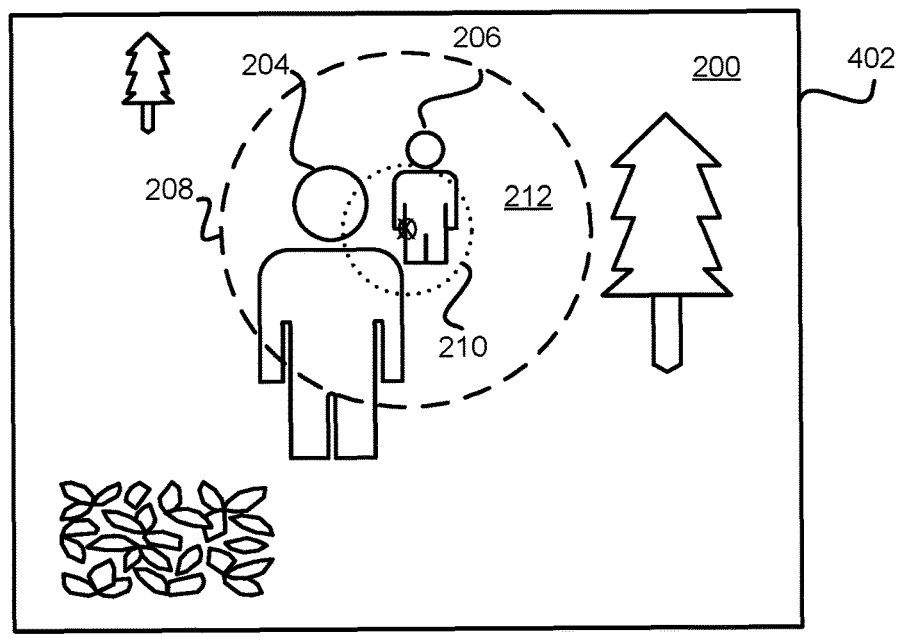
FIG. 4 illustrates an exemplary graphic of a rendering of the focal area in an image, in accordance with one or more implementations.

FIG. 4 illustrates a third image 402 of a third frame that corresponds to a third point in time. The third point in time may occur temporally after the second point in time. The third image 402 may include a view of the virtual space 200 corresponding a field of view of the virtual space determined for the third point in time. The third image 402 may include the focal area 208 comprising one or more of the foveal region 210, the area 212 outside the foveal region 210, and/or other components. The third image 402 depicts the second virtual object 206 being positioned adjacent the first virtual object 204, for example, during one or more of combat, dialog, and/or other interaction.

Returning to FIG. 2, in some implementations, the size of the focal area 208 may be determined such that the area 212 outside the foveal region 210 has a width "W." The width "W" may be determined based on one or more of the user's maximum saccadic speed, a gaze adjustment latency (assumed as a constant value), and/or other factors. For example, the width "W" may be the product of the user's maximum saccadic speed and the gaze adjustment latency. Latency may cause the focal area 208 to lag in maintaining its alignment with the foveal region 210. As such, as the users gaze direction changes, for example the user's gaze direction shifts in a first direction 214 (e.g., causing the foveal region 210 to move in the first direction 214 as well), the focal area 208 may not be able to "keep up" and stay aligned (FIG. 3). For illustrative purposes, the shift in the first direction 214 (FIG. 2) may be attributed to the users attention being drawn to the movement of the second virtual object 206. Based on the size of the focal area 208 and in particular the width "W," by the time the peripheral edge of the foveal region 210 reaches the peripheral edge of the focal area 208 (FIG. 3), the gaze adjustment latency has lapsed and the focal area 208 can now "catch up" and re-align with the foveal region 210 (FIG. 4). For example, the gaze adjustment latency may be amount of time between the first point in time and the third point in time.

Figure 5:
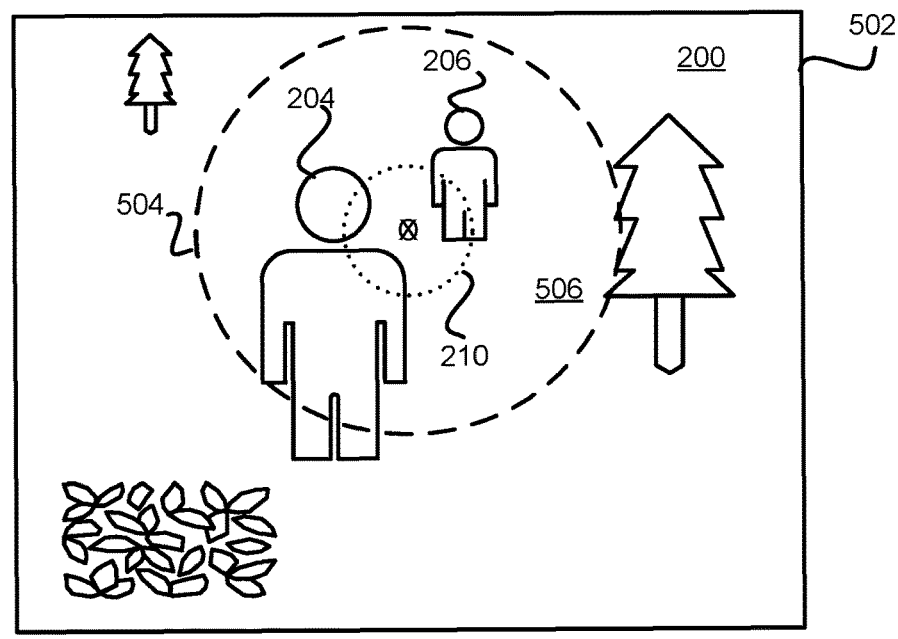
FIG. 5 illustrates an exemplary graphic of a rendering of the focal area in an image, in accordance with one or more implementations.

FIG. 5 illustrates a fourth image 502 of a fourth frame that corresponds to a fourth point in time. The fourth point in time may occur temporally after the third point in time. The fourth image 502 may include a view of the virtual space 200 corresponding a field of view of the virtual space determined for the fourth point in time. The fourth image 402 may include an latency-adjusted focal area 504 comprising one or more of the foveal region 210, an adjusted area 506 outside the foveal region 210, and/or other components. The fourth image 502 depicts the second virtual object 206 moving away from the first virtual object 204, for example, post combat, dialog, and/or other interaction.

The fourth image 402 may illustrate an implementation of system 100 (FIG. 1) where gaze adjustment latency may not be assumed as a constant value but may instead by determined in an on-going basis. By way of non-limiting example, at the fourth point in time, the latency component 114 (FIG. 1) may be configured to determine a new gaze adjustment latency. The new gaze adjustment latency may quantify latency in determining changes in the gaze direction between the second and third frames and making corresponding adjustments (e.g., positional and/or size adjustments) to the focal area 208 between the second and third frames. For illustrative purposes, the adjusted focal area 504 may have a size that may be increased relative the focal area 208 in FIGS. 2-4 by virtue of the new gaze adjustment latency being higher than gaze adjustment latency attributed to the preceding frames. However, if it is determined that gaze adjustment latency has decreased, the size of the focal area may be reduced (e.g., given that the focal area may now "keep up" faster with the user's tracked gaze direction).

Figure 6:
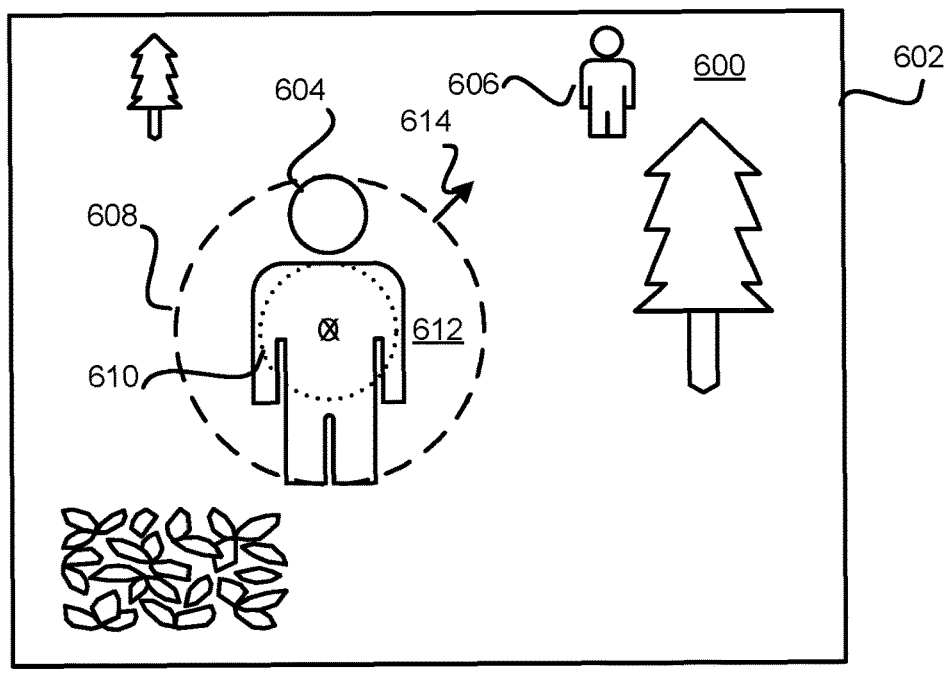
FIG. 6 illustrates an exemplary graphic of a rendering of the focal area in an image, in accordance with one or more implementations.
Figure 7:
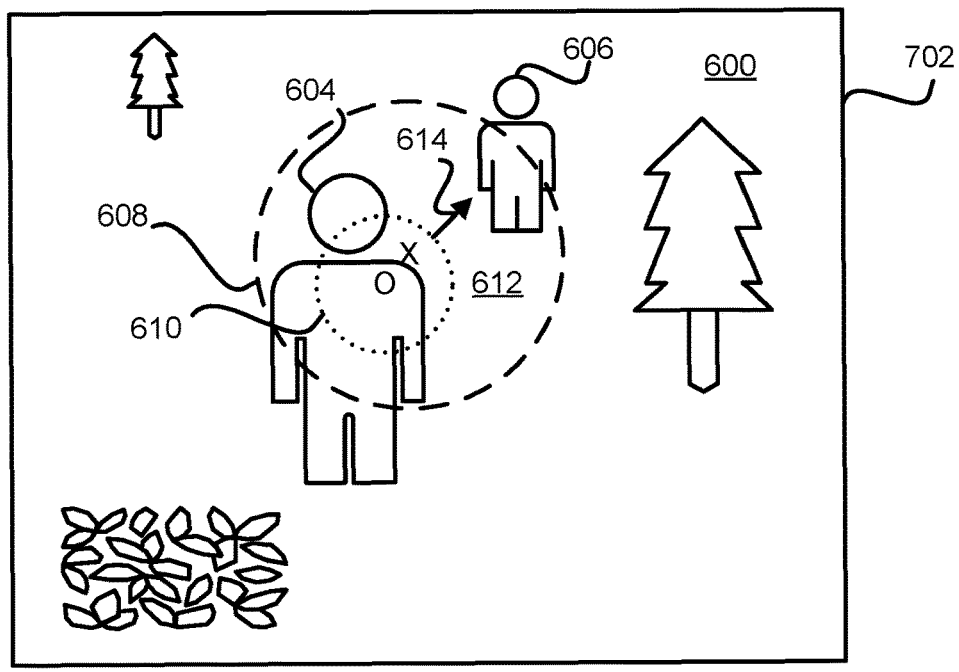
FIG. 7 illustrates an exemplary graphic of a rendering of the focal area in an image, in accordance with one or more implementations.
Figure 8:
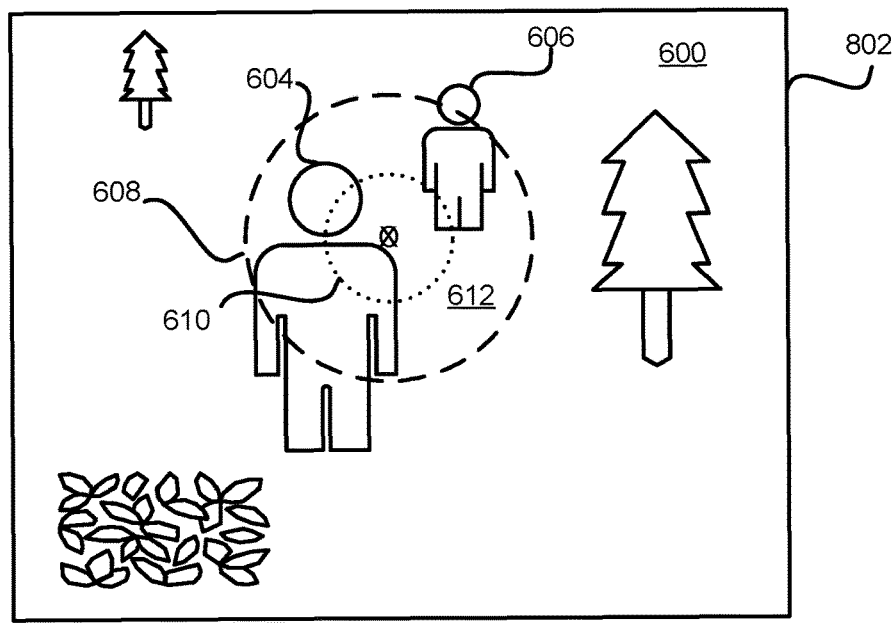
FIG. 8 illustrates an exemplary graphic of a rendering of the focal area in an image, in accordance with one or more implementations

FIGS. 6-8 illustrate various frame images having focal areas rendered in accordance with a gaze-predictive implementation of system 100. For illustrative purposes, the frame images shown in the figures will be considered as sequentially presented frame images of an animation. For example, FIG. 6 illustrates a first image 602 of a first frame that corresponds to a first point in time. The first image 602 may include a view of a virtual space 600 corresponding a field of view of the virtual space determined for the first point in time. The view of the virtual space may include one or more virtual objects and their position determined from state information at the first point in time. The one or more virtual object may include a first virtual object 604, a second virtual object 606, and/or other virtual objects. The first virtual object 604 may be assigned a main character role and/or other role. The second virtual object 606 may be assigned a combatant role and/or other role.

The first image 602 may include a focal area 608 (having a peripheral edge shown by the dashed line and an imaginary center point shown by the "X"). The focal area 608 may comprise one or more of a foveal region 610 (having a peripheral edge shown by the dotted line and an imaginary center point shown by the "O"), an area 612 outside the foveal region 610, and/or other components. The center point "O" of the foveal region 610 may be a point of eye fixation. The focal area 608 may be aligned with the foveal region 610 (shown by the "X" overlaid on the "O").

FIG. 7 illustrates a second image 702 of a second frame that corresponds to a second point in time. The second point in time may occur temporally after the first point in time. The second image 702 may include a view of the virtual space 600 corresponding a field of view of the virtual space determined for the second point in time. The second image 702 may include the focal area 608 comprising one or more of the foveal region 610, the area 612 outside the foveal region 210, and/or other components. The second image 702 depicts movement of the second virtual object 606 toward the first virtual object 604, for example, in accordance with one or more of a combat scenario, dialog, and/or other interaction.

FIG. 8 illustrates a third image 802 of a third frame that corresponds to a third point in time. The third point in time may occur temporally after the second point in time. The third image 802 may include a view of the virtual space 600 corresponding a field of view of the virtual space determined for the third point in time. The third image 802 may include the focal area 608 comprising one or more of the foveal region 610, the area 612 outside the foveal region 610, and/or other components. The third image 802 depicts the second virtual object 606 being positioned adjacent the first virtual object 604, for example, during combat, dialog, and/or other interaction.

The positional changes of the focal area 608 between the frames of FIGS. 6-8 illustrates a result of a gaze-predictive implementation of system 100 (FIG. 1). By way of non-limiting example, the position of focal area 608 in FIG. 6 may correspond to the first virtual object 604 being determined (e.g., via machine learning) as a statistical target of eye fixation. This may be attributed to one or more of previous eye tracking sessions of one or more users that conveyed that users in average viewed the first virtual object 604 at the first point in time of the first frame 602, the role assigned to the first virtual object 604, the position of the first virtual object 604 within a substantially central region of the image, and/or other factors.

The focal area 608 may be adjusted in a first direction 614 (FIG. 6) toward the second virtual object 606. This adjustment may be based on a region that includes both the first virtual object 604 and second virtual object 606 in the second image 702 (FIG. 7) comprising a region of eye fixation. By way of non-limiting example, the position of the focal area 608 in FIG. 7 may correspond to the region embodying the focal area 608 being determined (e.g., via machine learning) as a statistical target of eye fixation. This may be attributed to one or more of previous eye tracking sessions of one or more users that conveyed that users in average shifted their attention toward the second virtual object 606, the movement of the second virtual object 606 toward the first virtual object 604 and away from the edge of the second image 702, the role assigned to the second virtual object 606, the position of the second virtual object 606, and/or other factors. It is noted that since the prediction of the focal area 608 may indeed be a prediction, the focal area 608 may not maintain a true alignment with the user's foveal region 610 (as illustrated by the offset center point "O" of the foveal region 610 with respect to the center point "X" of the focal area 608). However, as shown in FIG. 8, the user's foveal region 610 may catch up with the predicted focal area 608.

It is noted that the illustrations in FIGS. 2-8 and corresponds descriptions were provided for illustrative purposes only and are not to be considered limiting. Instead, the illustrations were provided merely show particular implementations of system 100 (FIG. 1) and the effect individual implementations may have on rendered frame images. In other implementations, the size and/or position of a focal area, the views of the virtual space, the virtual objects shown in the virtual space, and/or other aspects described specifically for FIG. 2-8 may be different.

Returning to FIG. 1, server 102, computing platform 124, external resources 12, gaze tracking device 126, and/or other entities participating in system 100 may be operatively linked via one or more electronic communication links. For example, such electronic communication links may be established, at least in part, via a network 120 such as the Internet and/or other networks. It will be appreciated that this is not intended to be limiting and that the scope of this disclosure includes implementations in which server 102, computing platform 124, external resources 12, and/or other entities participating in system 100 may be operatively linked via some other communication media.

The external resources 122 may include sources of information, hosts, and/or providers of virtual spaces outside of system 100, external entities participating with system 100, external entities for player-to-player communications, and/or other resources. In some implementations, some or all of the functionality attributed herein to external resources 122 may be provided by resources included in system 100.

Server 102 may include electronic storage 119, one or more processors 104, and/or other components. Server 102 may include communication lines or ports to enable the exchange of information with network 120, computing platform 124, external resources 122, and/or entities. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 119 may comprise electronic storage media that electronically stores information. The electronic storage media of electronic storage 119 may include one or both of system storage that is provided integrally (i.e., substantially non-removable) with server 102 and/or removable storage that is removably connectable to server 102 via, for example, a port or a drive. A port may include a USB port, a firewire port, and/or other port. A drive may include a disk drive and/or other drive. Electronic storage 119 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 119 may include one or more virtual storage resources (e.g., cloud storage, a virtual private network, and/or other virtual storage resources). Electronic storage 119 may store software algorithms, information determined by processor(s) 104, information received from computing platform 124, and/or other information that enables server 102 to function as described herein.

Processor(s) 104 is configured to provide information-processing capabilities in server 102. As such, processor(s) 104 may include one or more of a physical processor, a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. Processor(s) 104 may be configured to execute components 108, 109, 110, 112, 114, 116, and/or 118. Processor(s) 104 may be configured to execute components 108, 109, 110, 112, 114, 116, and/or 118 by software; hardware; firmware; some combination of software, hardware, and/or firmware; and/or other mechanisms for configuring processing capabilities on processor(s) 104.

It should be appreciated that although components 108, 109, 110, 112, 114, 116, and/or 118 are illustrated in FIG. 1 as being co-located within a single processing unit, in implementations in which processor(s) 104 includes multiple processing units, one or more of components 108, 109, 110, 112, 114, 116, and/or 118 may be located remotely from the other components. The description of the functionality provided by the different components 108, 109, 110, 112, 114, 116, and/or 118 described above is for illustrative purposes and is not intended to be limiting, as any of components 108, 109, 110, 112, 114, 116, and/or 118 may provide more or less functionality than is described. For example, one or more of components 108, 109, 110, 112, 114, 116, and/or 118 may be eliminated, and some or all of its functionality may be provided by other ones of components 108, 109, 110, 112, 114, 116, 118, and/or other components. As another example, processor(s) 104 may be configured to execute one or more additional components that may perform some or all of the functionality attributed below to one of components 108, 109, 110, 112, 114, 116, and/or 118.

Figure 10:
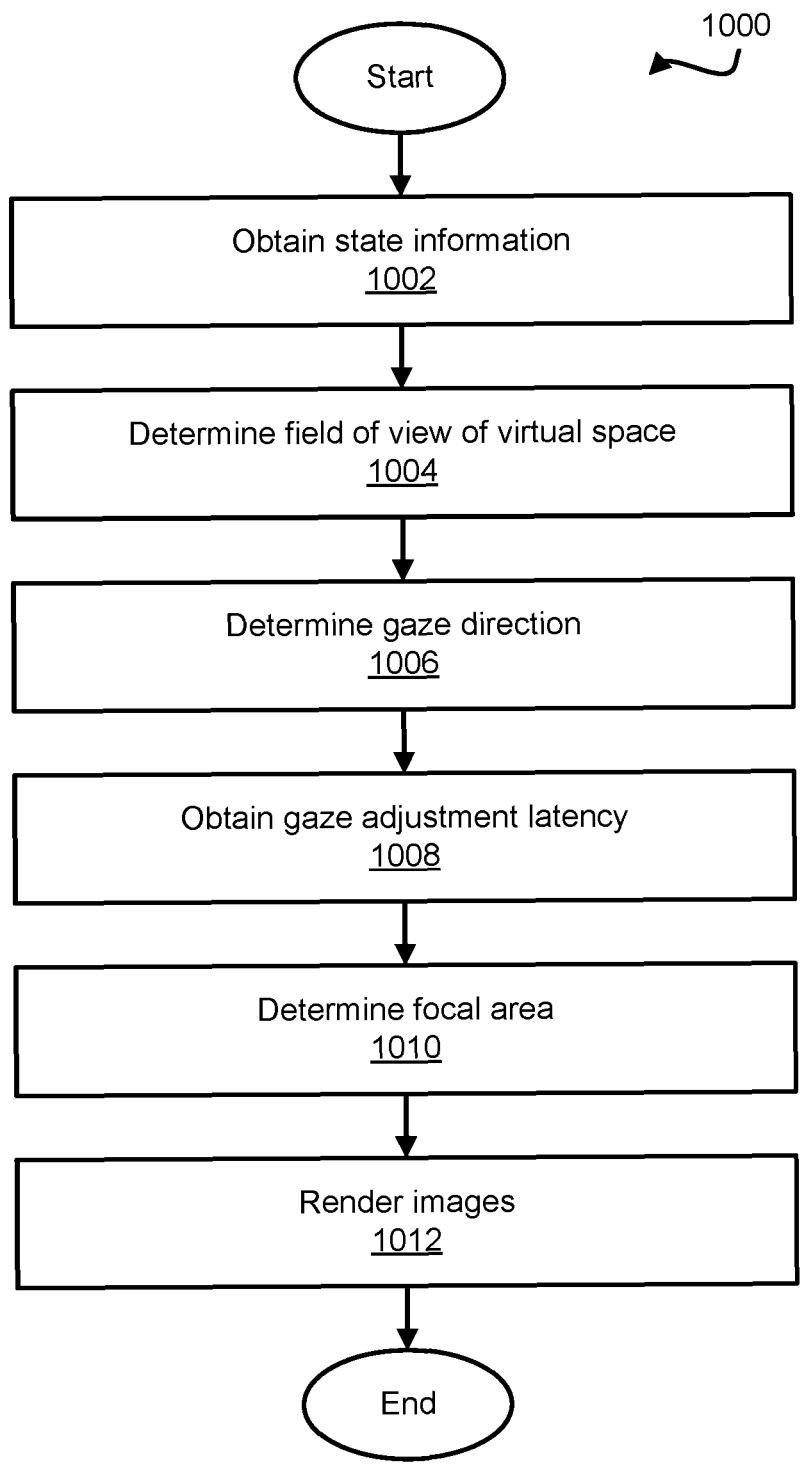
FIG. 10 illustrates a method of latency-aware rendering of a focal area of an animation presented on a display, in accordance with one or more implementations.

FIG. 10 illustrates a method 1000 of latency-aware rendering of a focal area of an animation presented on a display.

The operations of method 1000 presented below are intended to be illustrative. In some embodiments, method 1000 may be accomplished with one or more additional operations not described, and/or without one or more of the operations discussed. Additionally, the order in which the operations of method 1000 are illustrated in FIG. 10 and described below is not intended to be limiting.

In some implementations, method 1000 may be implemented in a computer system comprising one or more of one or more processing devices (e.g., a physical processor, a digital processor, an analog processor, a digital circuit designed to process information, an analog circuit designed to process information, a state machine, and/or other mechanisms for electronically processing information), storage media storing machine-readable instructions, and/or other components. The one or more processing devices may include one or more devices executing some or all of the operations of method 1000 in response to instructions stored electronically on electronic storage media. The one or more processing devices may include one or more devices configured through hardware, firmware, and/or software to be specifically designed for execution of one or more of the operations of method 1000.

At an operation 1002, state information describing state of a virtual space may be obtained. The state at an individual point in time may define one or more virtual objects within the virtual space, their positions, and/or other information. In some implementations, operation 1002 may be performed by one or more physical processors executing a space component the same as or similar to space component 108 (shown in FIG. 1 and described herein).

At an operation 1004, a field of view of the virtual space may be determined. The frames of the animation may comprise images of the virtual space within the field of view. By way of non-limiting example, a first frame may comprise an image of the virtual space within the field of view at a point in time that corresponds to the first frame. In some implementations, operation 1004 may be performed by one or more physical processors executing a field of view component the same as or similar to field of view 110 (shown in FIG. 1 and described herein).

At an operation 1006, a gaze direction of a user within the field of view may be determined. The gaze direction may define a line of sight of the user. The user may view the animation via the display. In some implementations, operation 1006 may be performed by one or more physical processors executing a gaze component the same as or similar to the gaze component 112 (shown in FIG. 1 and described herein).

At an operation 1008, gaze adjustment latency may be obtained. The gaze adjustment latency may quantify latency in one or more of determining changes in the gaze direction, making corresponding adjustments to a focal area within the field of view, and/or other operations of method 1000. In some implementations, operation 1008 may be performed by one or more physical processors executing a latency component the same as or similar to the latency component 114 (shown in FIG. 1 and described herein).

At an operation 1010, a focal area within a field of view may be determined based on one or more of the gaze direction, gaze adjustment latency, and/or other information. The focal area may include one or more of a foveal region corresponding to the gaze direction, an area surrounding the foveal region, and/or other components. The foveal region may comprise a region along the user's line of sight that permits high visual acuity with respect to a periphery of the line of sight. In some implementations, operation 1010 may be performed by one or more physical processors executing a focal area component the same as or similar to the focal area component 116 (shown in FIG. 1 and described herein).

At an operation 1012, individual images for individual frames of the animation may be rendered from the state information. Individual images may depict the virtual space within the field of view determined at individual points in time that corresponds to individual frames. By way of non-limiting example, a first image may be rendered for the first frame. The first image may depict the virtual space within the field of view at the point in time corresponding to the first frame. A focal area within the field of view may be rendered at a higher resolution than an area outside the focal area. In some implementations, operation 1012 may be performed by one or more physical processors executing a render component the same as or similar to the render component 118 (shown in FIG. 1 and described herein).

Figure 11:
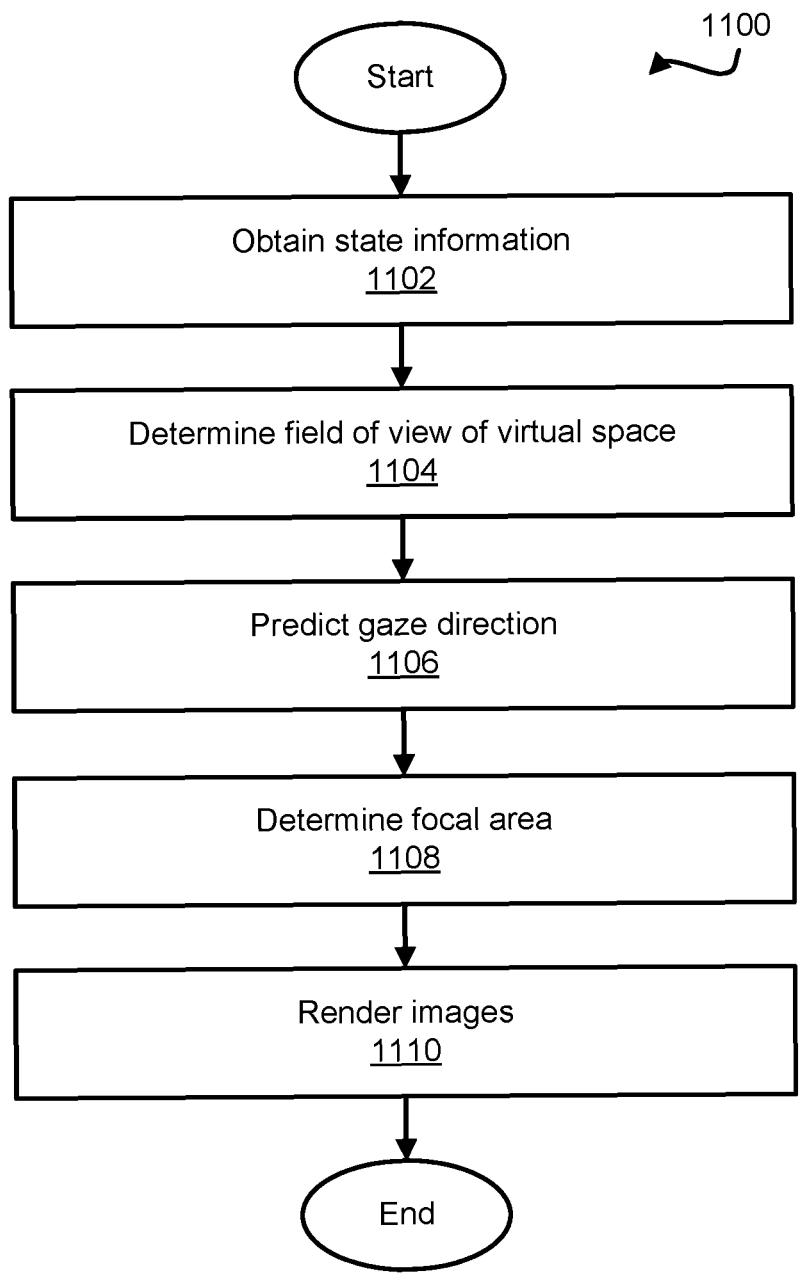
FIG. 11 illustrates a method of gaze-predictive rendering of a focal area of an animation presented on a display, in accordance with one or more implementations.

FIG. 11 illustrates a method 1100 of gaze-predictive rendering of a focal area of an animation presented on a display. The operations of method 1100 presented below are intended to be illustrative. In some embodiments, method 1100 may be accomplished with one or more additional operations not described, and/or without one or more of the operations discussed. Additionally, the order in which the operations of method 1100 are illustrated in FIG. 11 and described below is not intended to be limiting.

In some implementations, method 1100 may be implemented in a computer system comprising one or more of one or more processing devices (e.g., a physical processor, a digital processor, an analog processor, a digital circuit designed to process information, an analog circuit designed to process information, a state machine, and/or other mechanisms for electronically processing information), storage media storing machine-readable instructions, and/or other components. The one or more processing devices may include one or more devices executing some or all of the operations of method 1100 in response to instructions stored electronically on electronic storage media. The one or more processing devices may include one or more devices configured through hardware, firmware, and/or software to be specifically designed for execution of one or more of the operations of method 1100.

At an operation 1102, state information describing state of a virtual space may be obtained. The state at an individual point in time may define one or more virtual objects within the virtual space, their positions, and/or other information. In some implementations, operation 1102 may be performed by one or more physical processors executing a space component the same as or similar to space component 108 (shown in FIG. 1 and described herein).

At an operation 1104, a field of view of the virtual space may be determined. The frames of the animation may comprise images of the virtual space within the field of view. By way of non-limiting example, a first frame may comprise an image of the virtual space within the field of view at a point in time that corresponds to the first frame. In some implementations, operation 1104 may be performed by one or more physical processors executing a field of view component the same as or similar to field of view 110 (shown in FIG. 1 and described herein).

At an operation 1106, a gaze direction of a user within the field of view may be predicted. The gaze direction may define line of sight of the user. The user may view the animation via the display. In some implementations, operation 1106 may be performed by one or more physical processors executing a gaze component the same as or similar to the gaze component 112 (shown in FIG. 1 and described herein).

At an operation 1108, a focal area within a field of view may be determined based on the predicted gaze direction and/or other information. The focal area may include one or more of a foveal region corresponding to the predicted gaze direction, an area surrounding the foveal region, and/or other components. The foveal region may comprise a region along the user's line of sight that permits high visual acuity with respect to a periphery of the line of sight. In some implementations, operation 1108 may be performed by one or more physical processors executing a focal area component the same as or similar to the focal area component 116 (shown in FIG. 1 and described herein).

At an operation 1110, individual images for individual frames of the animation may be rendered from the state information. Individual images may depict the virtual space within the field of view determined at individual points in time that corresponds to individual frames. By way of non-limiting example, a first image may be rendered for the first frame. The first image may depict the virtual space within the field of view at the point in time corresponding to the first frame. The focal area within the field of view may be rendered at a higher resolution than an area outside the focal area. In some implementations, operation 1110 may be performed by one or more physical processors executing a render component the same as or similar to the render component 118 (shown in FIG. 1 and described herein).

Figure 12:
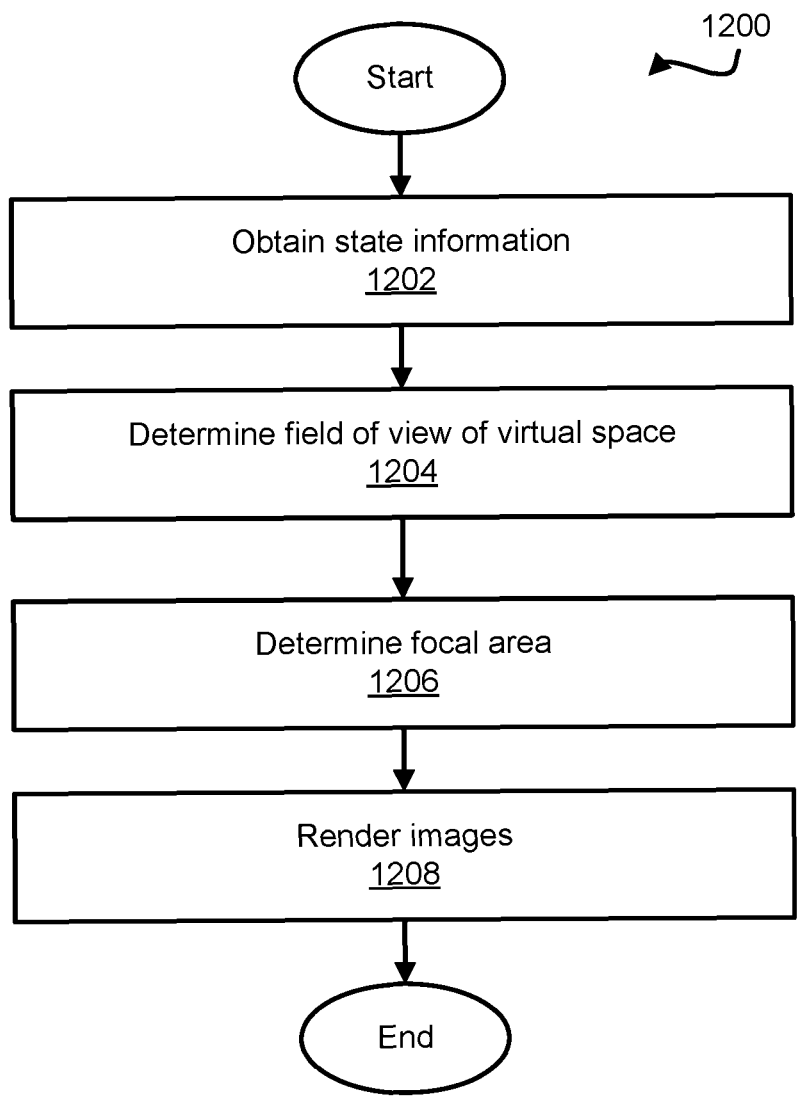
FIG. 12 illustrates a method of bandwidth-sensitive rendering of a focal area of an animation presented on a display, in accordance with one or more implementations.

FIG. 12 illustrates a method 1200 of bandwidth-sensitive rendering of a focal area of an animation presented on a display. The operations of method 1200 presented below are intended to be illustrative. In some embodiments, method 1200 may be accomplished with one or more additional operations not described, and/or without one or more of the operations discussed. Additionally, the order in which the operations of method 1200 are illustrated in FIG. 12 and described below is not intended to be limiting.

In some implementations, method 1200 may be implemented in a computer system comprising one or more of one or more processing devices (e.g., a physical processor, a digital processor, an analog processor, a digital circuit designed to process information, an analog circuit designed to process information, a state machine, and/or other mechanisms for electronically processing information), storage media storing machine-readable instructions, and/or other components. The one or more processing devices may include one or more devices executing some or all of the operations of method 1200 in response to instructions stored electronically on electronic storage media. The one or more processing devices may include one or more devices configured through hardware, firmware, and/or software to be specifically designed for execution of one or more of the operations of method 1200.

At an operation 1202, state information describing state of a virtual space may be obtained. The state at an individual point in time may define one or more virtual objects within the virtual space, their positions, and/or other information. In some implementations, operation 1202 may be performed by one or more physical processors executing a space component the same as or similar to space component 108 (shown in FIG. 1 and described herein).

At an operation 1204, a field of view of the virtual space may be determined. The frames of the animation may comprise images of the virtual space within the field of view. By way of non-limiting example, a first frame may comprise an image of the virtual space within the field of view at a point in time that corresponds to the first frame. In some implementations, operation 1204 may be performed by one or more physical processors executing a field of view component the same as or similar to field of view 110 (shown in FIG. 1 and described herein).

At an operation 1206, a focal area within a field of view may be determined. The focal area may include one or more of a foveal region corresponding to a user's gaze direction, an area surrounding the foveal region, and/or other components. The foveal region may comprise a region along the user's line of sight that permits high visual acuity with respect to a periphery of the line of sight. In some implementations, operation 1206 may be performed by one or more physical processors executing a focal area component the same as or similar to the focal area component 116 (shown in FIG. 1 and described herein).

At an operation 1208, individual images for individual frames of the animation may be rendered from the state information. Individual images may depict the virtual space within the field of view determined at individual points in time that corresponds to individual frames. By way of non-limiting example, a first image may be rendered for the first frame. The first image may depict the virtual space within the field of view at the point in time corresponding to the first frame. The focal area within the field of view may be rendered with a higher color bit depth and/or higher luminance bit depth relative an area outside the focal area. In some implementations, operation 1208 may be performed by one or more physical processors executing a render component the same as or similar to the render component 118 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method of latency-aware rendering of a focal area of an animation presented on a display, the animation including a sequence of frames, the sequence of frames including a first frame, the method being implemented in a computer system comprising one or more physical processors and storage media storing machine-readable instructions, the method comprising:

obtaining state information describing state of a virtual space, the state at an individual point in time defining one or more virtual objects within the virtual space and their positions;

determining a field of view of the virtual space, the frames of the animation being images of the virtual space within the field of view, such that the first frame is an image of the virtual space within the field of view at a point in time that corresponds to the first frame;

determining a gaze direction of a user within the field of view, the gaze direction defining a line of sight of the user, the user viewing the animation via the display;

obtaining gaze adjustment latency, wherein the gaze adjustment latency quantifies latency in determining changes in the gaze direction and making corresponding adjustments to the focal area within the field of view;

determining the focal area within the field of view based on the gaze direction and gaze adjustment latency, the focal area including a foveal region corresponding to the gaze direction and an area surrounding the foveal region, wherein the foveal region is a region along the user's line of sight that permits high visual acuity with respect to a periphery of the line of sight;

rendering, from the state information, individual images for individual frames of the animation, the individual images depicting the virtual space within the field of view determined at the individual points in time that corresponds to the individual frames, including rendering a first image for the first frame, the first image depicting the virtual space within the field of view at the point in time corresponding to the first frame, wherein the focal area within the field of view is rendered at a higher resolution than an area outside the focal area; and determining the gaze adjustment latency recursively, wherein determining the gaze adjustment latency recursively comprises determining the gaze adjustment latency after successive renders of the individual images of the individual frames of the animation.

2. The method of claim 1, wherein determining the focal area comprises determining a size of the focal area, the size being a function of the gaze adjustment latency.

3. The method of claim 2, wherein the size of the focal area is further a function of one or more of the user's maximum saccadic speed, the user's distance from the display, an angle subtended by a fovea of the user's eye, or a pixel density of the display.

4. The method of claim 1, wherein determining the focal area comprises determining a position of a center point of the focal area based on the gaze direction.

5. The method of claim 1, wherein the frames include a second frame corresponding to a second point in time, the second point in time following the point in time corresponding to the first frame, and wherein responsive to rendering the first image for the first frame, the method further comprises:
  determining a second gaze direction of the user corresponding to the second point in time;
  determining a second field of view of the virtual space based on the second gaze direction;
  determining a second gaze adjustment latency, the second gaze adjustment latency quantifying latency in determining a change to the gaze direction and making corresponding adjustments to the focal area within the field of view;
  determining a second focal area within the second field of view based on the second gaze direction and second gaze adjustment latency, the second focal area being different than the focal area; and
  rendering a second image for the second frame, the second image depicting the virtual space within the second field of view at the second point in time corresponding to the second frame, wherein the second focal area within the field of view is rendered at a higher resolution than an area outside the second focal area.

6. The method of claim 1, determining the gaze direction of the user based on output from a gaze tracking device.

7. The method of claim 1, wherein determining the field of view of the virtual space further comprises determining an orientation of the user.

8. The method of claim 7, wherein determining an orientation of the user comprises determining an orientation of the virtual reality headset worn by the user.

9. The method of claim 1, wherein the virtual space includes a video game taking place in the virtual space.

10. A system configured for latency-aware rendering of a focal area of an animation presented on a display, wherein the animation includes a sequence of frames, the sequence of frames including a first frame, the system comprising:
  one or more physical processors configured by machine-readable instructions to:
    obtain state information describing state of a virtual space, the state at an individual point in time defining one or more virtual objects within the virtual space and their positions;
    determine a field of view of the virtual space, the frames of the animation being images of the virtual space within the field of view, such that the first frame is an image of the virtual space within the field of view at a point in time that corresponds to the first frame;
    determine a gaze direction of a user within the field of view, the gaze direction defining a line of sight of the user, the user viewing the animation via the display;
    obtain gaze adjustment latency, wherein the gaze adjustment latency quantifies latency in determining changes in the gaze direction and making corresponding adjustments to the focal area within the field of view;
    determine the focal area within the field of view based on the gaze direction and gaze adjustment latency, the focal area including a foveal region corresponding to the gaze direction and an area surrounding the foveal region, wherein the foveal region is a region along the user's line of sight that permits high visual acuity with respect to a periphery of the line of sight;
    render, from the state information, individual images for individual frames of the animation, the individual images depicting the virtual space within the field of view determined at the individual points in time that corresponds to the individual frames, the rendered images including a first image for the first frame, the first image depicting the virtual space within the field of view at the point in time corresponding to the first frame, wherein the focal area within the field of view is rendered at a higher resolution than an area outside the focal area; and
    determine the gaze adjustment latency recursively, wherein determining the gaze adjustment latency recursively comprises determining the gaze adjustment latency after successive renders of the individual images of the individual frames of the animation.

11. The system of claim 10, wherein determining the focal area comprises determining a size of the focal area, the size being a function of the gaze adjustment latency.

12. The system of claim 11, wherein the size of the focal area is further a function of one or more of the user's maximum saccadic speed, the user's distance from the display, an angle subtended by a fovea of the user's eye, or a pixel density of the display.

13. The system of claim 10, wherein determining the focal area comprises determining a position of a center point of the focal area based on the gaze direction.

14. The system of claim 10, wherein the frames include a second frame corresponding to a second point in time, the second point in time following the point in time corresponding to the first frame, and wherein responsive to rendering the first image for the first frame:
- determine a second gaze direction of the user corresponding to the second point in time;
- determine a second field of view of the virtual space based on the second gaze direction;
- determine a second gaze adjustment latency, the second gaze adjustment latency quantifying latency in determining a change to the gaze direction and making corresponding adjustments to the focal area within the field of view;
- determine a second focal area within the second field of view based on the second gaze direction and second gaze adjustment latency, the second focal area being different than the focal area; and
- render a second image for the second frame, the second image depicting the virtual space within the second field of view at the second point in time corresponding to the second frame, wherein the second focal area within the field of view is rendered at a higher resolution than an area outside the second focal area.

15. The system of claim 10, further comprising:
- a gaze tracking device, the gaze tracking device being configured to determine the gaze direction of the user.

16. The system of claim 10, wherein determining the field of view of the virtual space further comprises determining an orientation of the user.

17. The system of claim 16, further comprising a virtual reality headset, and wherein:
- the virtual reality headset includes the display; and
- determining the orientation of the user comprises determining an orientation of the virtual reality headset.

18. The system of claim 10, wherein the virtual space includes a video game taking place in the virtual space.

* * * * *